(12) United States Patent
Barnes et al.

(10) Patent No.: US 11,005,760 B2
(45) Date of Patent: *May 11, 2021

(54) ENSURING DATA LOCALITY FOR SECURE TRANSMISSION OF DATA

(71) Applicant: International Business Machines Corporation, Armonk, NY (US)

(72) Inventors: Andrew Barnes, Greystones (IE); John Delaney, Kildalkey (IE); Alexander J. Harvilchuck, Camp Hill, PA (US); Kenneth Weber, Edinboro, PA (US); Clea Zolotow, Key West, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/838,747

(22) Filed: Apr. 2, 2020

(65) Prior Publication Data

US 2020/0236049 A1 Jul. 23, 2020

Related U.S. Application Data

(63) Continuation of application No. 15/835,741, filed on Dec. 8, 2017, now Pat. No. 10,721,166.

(51) Int. Cl.
*H04L 12/741* (2013.01)
*H04L 12/46* (2006.01)
*H04L 12/24* (2006.01)
(Continued)

(52) U.S. Cl.
CPC .......... *H04L 45/745* (2013.01); *G06F 21/606* (2013.01); *G06F 21/6218* (2013.01);
(Continued)

(58) Field of Classification Search
CPC ... H04L 45/745; H04L 63/04; H04L 12/4641; H04L 41/5051; H04L 43/04; H04L 43/10;
(Continued)

(56) References Cited

U.S. PATENT DOCUMENTS 5,615,254 A ‡ 3/1997 Qiu .......................... H04Q 3/66
379/221.01
8,411,666 B1‡ 4/2013 Rogers .................. H04L 45/126
370/351

(Continued)

OTHER PUBLICATIONS

"List of IBM Patents or Patent Applications Treated as Related," Letter from Leslie A. Van Leeuwen, Apr. 2, 2020, 1 page.

*Primary Examiner* — Christopher A Revak
(74) *Attorney, Agent, or Firm* — VanLeeuwen & VanLeeuwen; Jeffrey S. LaBaw

(57) ABSTRACT

An approach is provided that selects a geographic location to which transmission of a data packet is disallowed. The approach identifies disallowed network devices that reside in the selected geographic location and builds a routing path through a public computer network through an allowed set of network devices with the allowed set of network devices not including any of the disallowed network devices. The approach then transmits the data packet from a transmitting network device to a receiving network device using the routing path.

15 Claims, 6 Drawing Sheets

(51) Int. Cl.
*H04W 4/021* (2018.01)
*G06F 21/62* (2013.01)
*G06F 21/60* (2013.01)
*H04L 29/06* (2006.01)
*G06Q 30/02* (2012.01)
*H04L 12/26* (2006.01)

(52) U.S. Cl.
CPC ...... *H04L 12/4641* (2013.01); *H04L 41/5051* (2013.01); *H04L 63/04* (2013.01); *H04W 4/021* (2013.01); *G06F 2221/2111* (2013.01); *G06Q 30/02* (2013.01); *H04L 43/04* (2013.01)

(58) Field of Classification Search
CPC . H04L 41/5077; H04L 41/12; H04L 63/0407; H04L 45/46; H04L 67/18; G06F 21/606; G06F 21/6218; G06F 2221/2111; H04W 4/021; G06Q 30/02
See application file for complete search history.

(56) References Cited

U.S. PATENT DOCUMENTS

| | | | | |
|---|---|---|---|---|
| 8,676,593 | B2 ‡ | 3/2014 | Nagpal | G06Q 30/02 |
| 9,407,650 | B2 ‡ | 8/2016 | Niemela | H04L 63/1425 |
| 9,514,324 | B1 ‡ | 12/2016 | Potlapally | H04L 63/10 |
| 9,641,630 | B2 ‡ | 5/2017 | Broussard | H04L 63/0492 |
| 9,641,971 | B2 ‡ | 5/2017 | Eda | H04W 4/021 |
| 9,660,895 | B1 ‡ | 5/2017 | Bennett | H04L 43/50 |
| 10,541,976 | B2 * | 1/2020 | Lapidous | H04L 63/029 |
| 10,721,166 | B2 * | 7/2020 | Barnes | H04L 41/5077 |
| 2016/0191341 | A1 ‡ | 6/2016 | Sivasankaran | H04L 41/5051 709/22 |
| 2016/0359915 | A1 ‡ | 12/2016 | Gupta | H04L 63/20 |
| 2018/0146001 | A1 ‡ | 5/2018 | Chien | H04L 63/061 |
| 2019/0182157 | A1 | 6/2019 | Barnes | |

\* cited by examiner
‡ imported from a related application

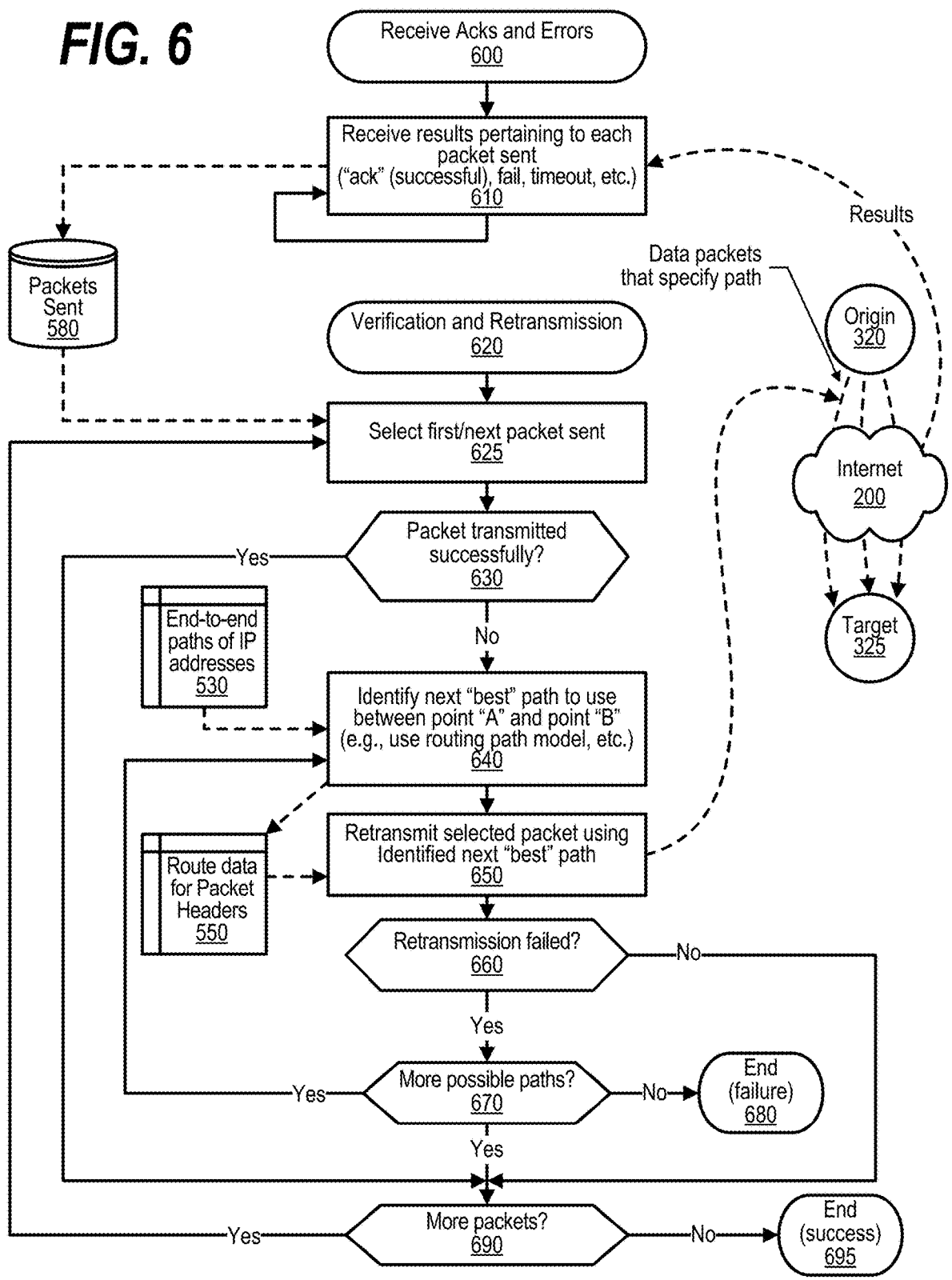

ENSURING DATA LOCALITY FOR SECURE TRANSMISSION OF DATA

BACKGROUND OF THE INVENTION

Description of Related Art

Many policies and laws deal with the handling of data, such as data that contains personally identifiable information (PII). Some of these policies and legislation, such as the General Data Protection Regulation (GDPR) in the European Union (EU), requires that data containing PII not only be kept in local storage but may also require that such data cannot travel through particular countries or jurisdictions (i.e. out of the EU). This becomes a challenge in any environment where data transmission can take loops from one datacenter to another. In these environments, point-to-point (PTP) networking is used together with an Internet backbone in order to conduct cloud-to-cloud communications. The Internet backbone that is used does not have the ability to constrict where data will travel to during its transmission from one datacenter to another, or from one physical location to another.

SUMMARY

An approach is provided that selects one or many geographic locations to which transmission of a data packet is disallowed. The approach identifies disallowed network devices that reside in the selected geographic location and builds a routing path through a public computer network through an allowed set of network devices with the allowed set of network devices does not include any of the disallowed network devices located in the disallowed areas. The approach then transmits the data packet from a transmitting network device to a receiving network device using the proscribed routing path.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention will be apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein:

FIG. 6 depicts a flowchart showing details of processes that handle errors, verification, and possible retransmission of data packets through a public network in a fashion that complies with geographic based policies and regulations.

DETAILED DESCRIPTION

Figure 1:
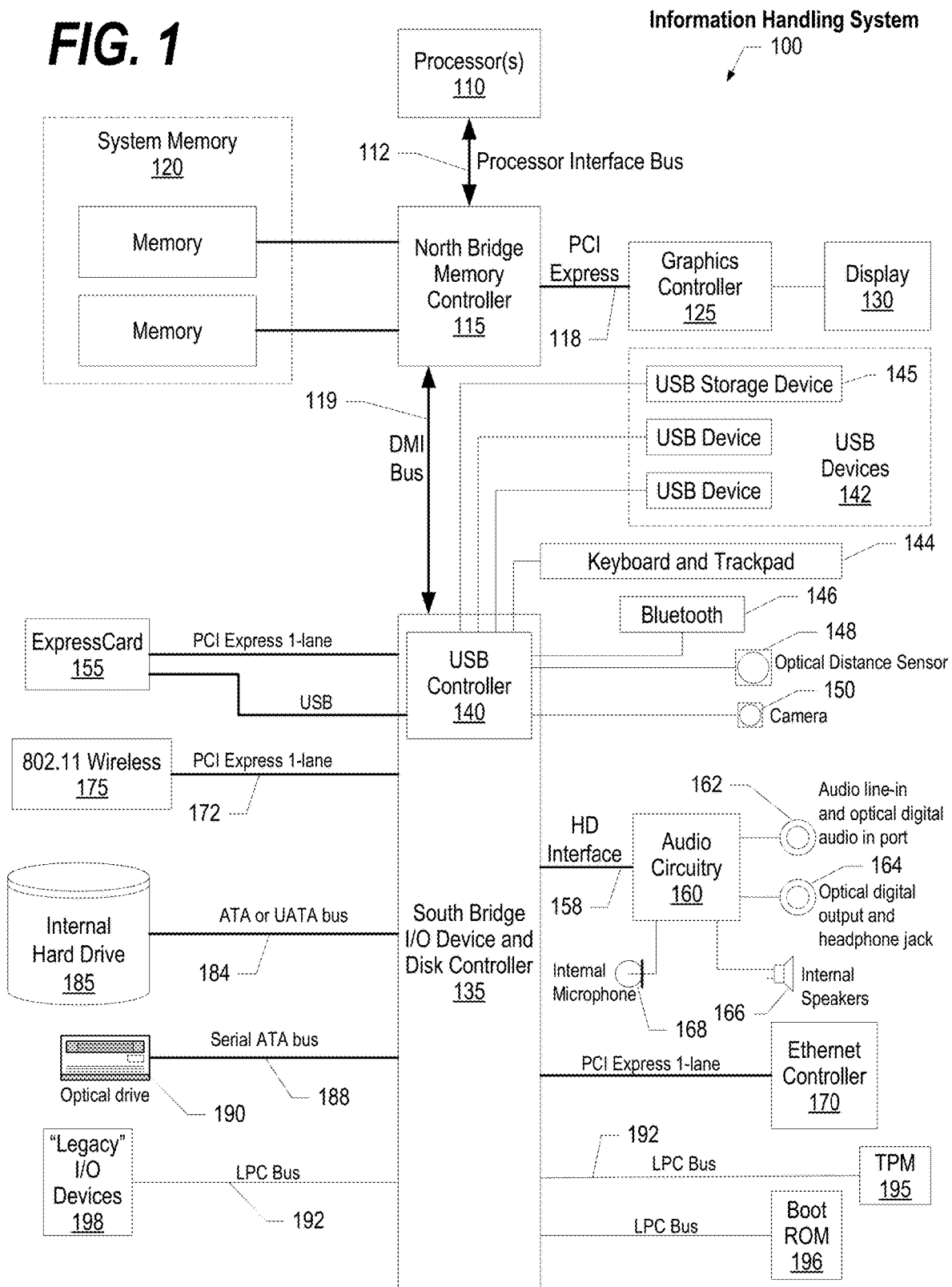
FIG. 1 depicts a block diagram of a data processing system in which illustrative embodiments may be implemented.

FIGS. 1-6 show an approach that ensures data locality for the secure transmission of data. Even though an IP address is logical, it is resident on physical hardware. Many geo-location services have mapped IP addresses to physical addresses (physical locations). The approach described herein takes this geo-location data, applies it to the public addresses on the routers on the Internet, and determines which network devices (e.g., routers, etc.) are not available for data transmission due to being in location (e.g., country, jurisdiction, etc.) where the data is not allowed to be due to security policies and/or regulations. The approach sends the geo-located information back to the organization's owned network devices (routers) to form a black/white list database of disallowed and/or allowed network addresses to ensure the data packet are not forwarded to a network device is a disallowed location.

In one embodiment, the approach is performed using the Enhanced Interior Gateway Routing Protocol (EIGRP). This protocol builds a topology table from each of its neighbor's advertisements (rather than discarding the data), and converges by either identifying a likely loop-free route in the topology table, or, if it knows of no other route, by querying its neighbors. In one embodiment, the approach utilizes one of the many ways to solve the "traveling salesmen problem" with the variant that certain locations are blocked and providing the data packets with a directed path through the Internet to arrive at the desired destination. Taking into account that IP systems can go dark, the approach provides for more than one directed paths upon which the data packets can travel. In one embodiment, the approach uses the "nearest neighbor" to solve the problem. Also note that the approach can either delete unwanted (e.g., forbidden, disallowed, etc.) nodes from the solution or it can keep such unwanted nodes in the solution and simply weigh them higher than any other node to ensure that they are not used in the transmission routing.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The detailed description has been presented for purposes of illustration, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. As used herein, a computer readable storage medium does not include a computer readable signal medium.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary, as set forth above, further explaining and expanding the definitions of the various aspects and embodiments as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

Figure 2:
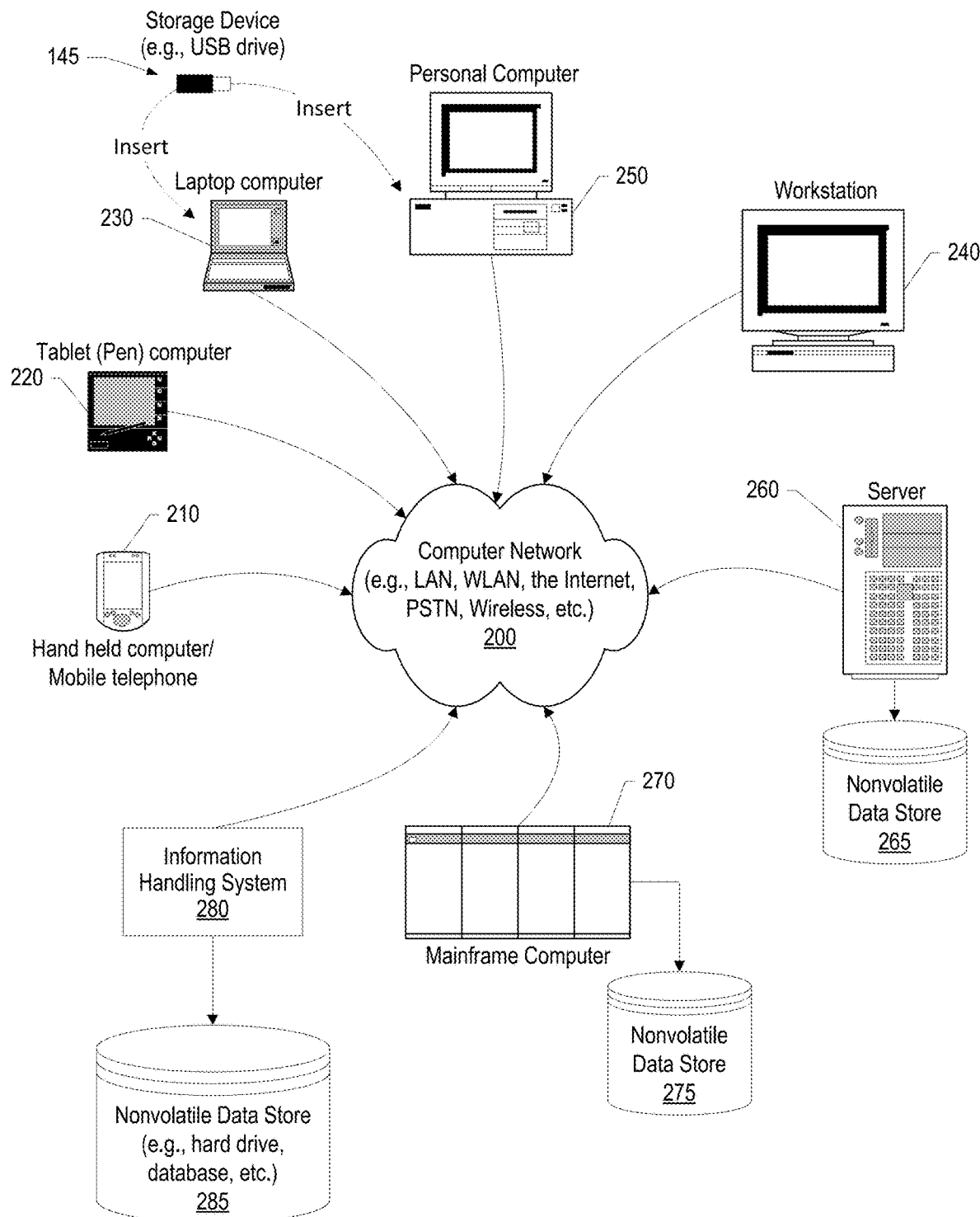
FIG. 2 depicts a block diagram of network of information handling systems as shown in FIG. 1 in which illustrative embodiments may be implemented.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, et cetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
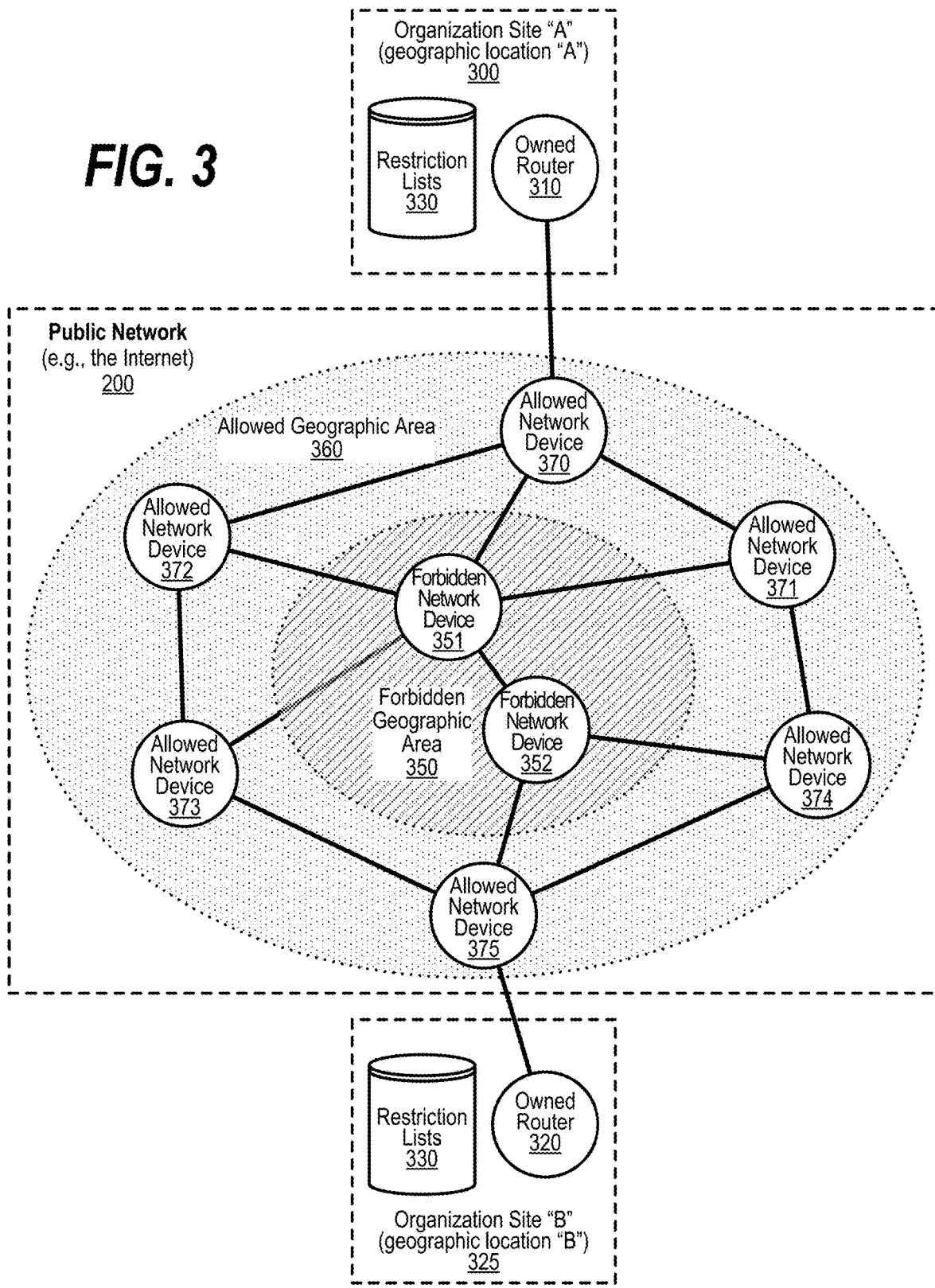
FIG. 3 depicts a diagram of allowed and disallowed geographic areas that determine possible paths for data packets.

FIG. 3 depicts a diagram of allowed and disallowed geographic areas that determine possible paths for data packets. An organization, such as a business, etc., is shown with two sites 300 and 325, such as data centers or the like. Data, in the form of data packets, are being sent between the two sites. Policies of the organization or legal regulations set forth by one or more governmental bodies (collectively, "data protection regulations") forbid the storing and/or transmission of all data or particular types of data (e.g., such as data including personally identifiable information ("PII"), etc.) through one or more geographic locations, such as particular foreign countries. To comply with such data protection regulations, restriction lists 330 are generated in a timely basis with these being either a "white list" of network device addresses through which data is allowed to be transmitted, a "black list" of network device addresses through which data is not permitted (disallowed) from being transmitted, or a combination of both.

In the example shown, the first organization site (site "A" 300) has an organization-owned network device, such as router 310, as well as access to restriction lists 330. Likewise, the second organization site (site "A" 300) also has an organization-owned network device, such as router 320, as well as access to restriction lists 330. Restriction lists 330 indicate which network devices in public network 200 are located in allowed geographic areas 360 and which are in forbidden, or disallowed, geographic areas 350. In the example shown, the disallowed geographic locations have network devices 351 and 352 located therein. Likewise, the allowed geographic locations have network devices 370, 371, 372, 373, 374, and 375. A process running on the organization sites builds a routing path so that packets transmitted from organization site 300 to organization site 325 only travel through network devices located in allowed geographic areas 360 and inhibit the transmission of the data packets through any disallowed geographic areas. So, if a data packet is being sent from site "A" to site "B," one routing path that might be used would be from the transmitting network device (e.g., router 310) to allowed network devices 370, 371, 374, and 375 and received at receiving network device (e.g., router 320). Another valid routing path would be from router 310 through network devices 370, 372, 373, and 375 and received at receiving network device 320. Note that the specified routing path would not include either network devices 351 or 352 as these two network devices have been identified as being located in a disallowed (forbidden) geographic location.

Figure 4:
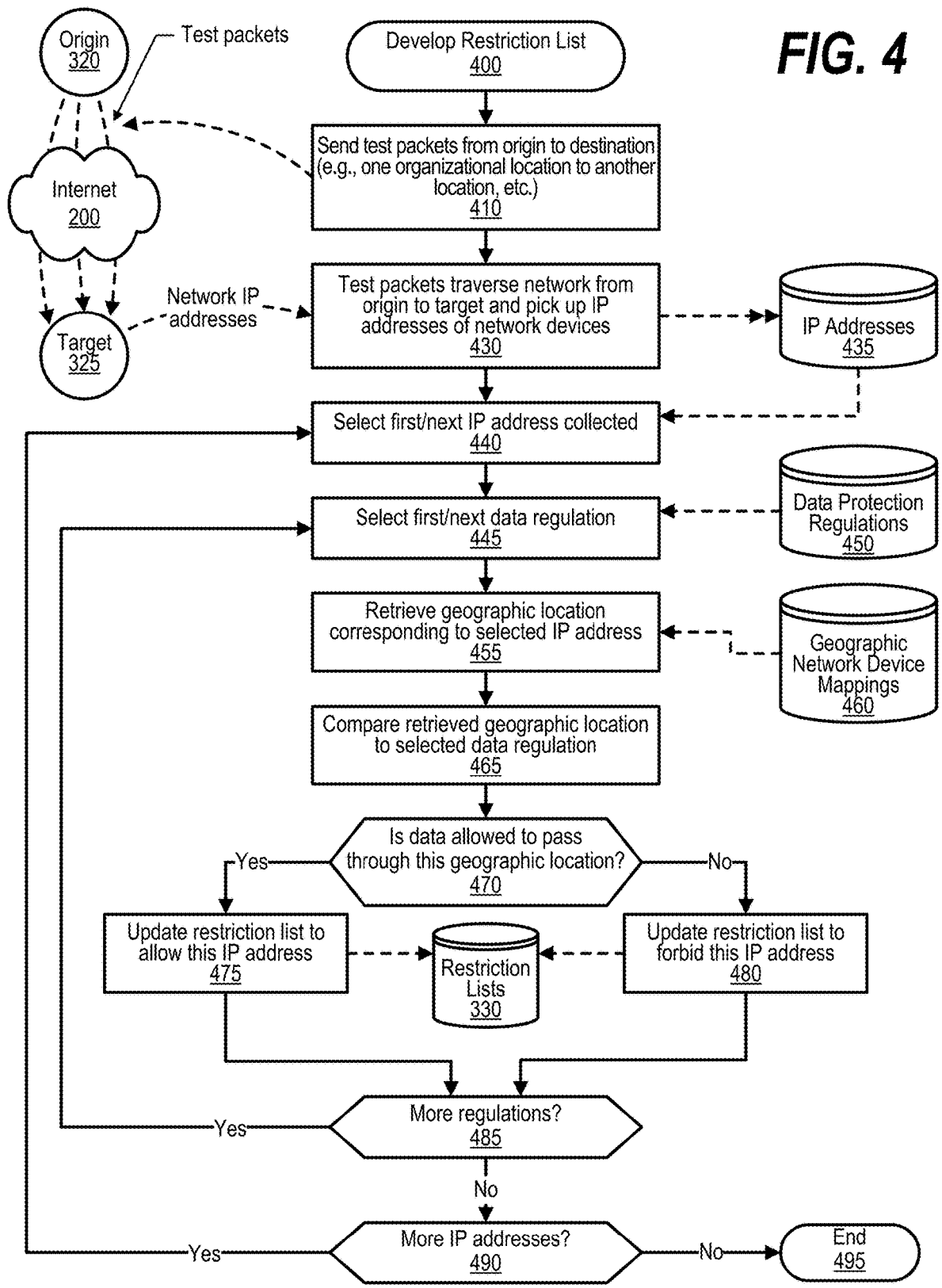
FIG. 4 depicts a flowchart showing the development of a restriction list of network devices through which data is forbidden due to policies or regulations.

FIG. 4 depicts a flowchart showing the development of a restriction list of network devices through which data is forbidden due to policies or regulations. FIG. 4 processing commences at 400 and shows the steps taken by a process that develops Restriction List 330 that is used to build routing paths that avoid network devices located in disallowed network locations. At step 410, the process sends test packets as needed from an origin network device to a destination network device. For example, the test packets might be sent from one organizational location to another location with the organizational locations using a public computer network, such as the Internet, to facilitate transmission of data between the locations. As shown, the test packets are transmitted from a transmitting network device (origin 320), through computer network 200, such as the Internet, and received at receiving network device (target 325). By sending numerous packets at different times and days, the various paths that are available through computer network 200 are exercised with the received packet including data regarding the network devices that were encountered while the packet traveled through the public network.

At step 430, after the test packets have traversed the public computer network from the transmitting network device the receiving network device, the process receives the network (IP) addresses of network devices through which the packet traveled. These IP addresses are stored in data store 435.

At step 440, an outer loop is commenced with the process selecting the first IP address that was collected and stored in data store 435. At step 445, an inner loop is commenced with the process selecting the first data protection regulation that applies to the organization (e.g., organization policy, governmental regulation, etc.). The data protection regulations are retrieved from data store 450 and these regulations can include multiple sources of information (e.g., multiple governmental regulations, multiple sources of organizational policies, etc.).

At step 455, the process retrieves the geographic location that corresponds to the selected IP address. The geographic location is retrieved in a timely basis from geographic network device mappings data store 460. In one embodiment, at least one of these mappings includes an Enhanced Interior Gateway Routing Protocol (EIGRP) database but can include any geo-location database, including private corporate databases. At step 465, the process compares the retrieved geographic location to the selected data regulation. The process determines as to whether data is allowed to pass through this geographic location (decision 470).

If data is allowed to pass through this geographic location, then decision 470 branches to the 'yes' branch whereupon, at step 475, the process updates restriction list 330 to allow this IP address (e.g., adding the selected IP address to a "white list," etc.). On the other hand, if data is not allowed to pass through this geographic location, then decision 470 branches to the 'no' branch whereupon, at step 480, the process updates restriction list 330 to disallow this IP address (e.g., adding the selected IP address to a "black list," etc.).

The process determines whether there are more data protection regulations to process for the selected IP address (decision 485). If there are more data protection regulations to process, then decision 485 branches to the 'yes' branch which loops back to step 445 to select and process the next data protection regulation as described above. This looping continues until there are no more data protection regulations to process, at which point decision 485 branches to the 'no' branch exiting the loop. The process next determines whether there are more IP addresses stored in data store 435 to select and process (decision 490). If there are more IP addresses to process, then decision 490 branches to the 'yes' branch which loops back to step 440 to select and process the next IP address as described above. This looping continues until there are no more IP addresses to process, at which point decision 490 branches to the 'no' branch exiting the loop. FIG. 4 processing thereafter ends at 495.

Figure 5:
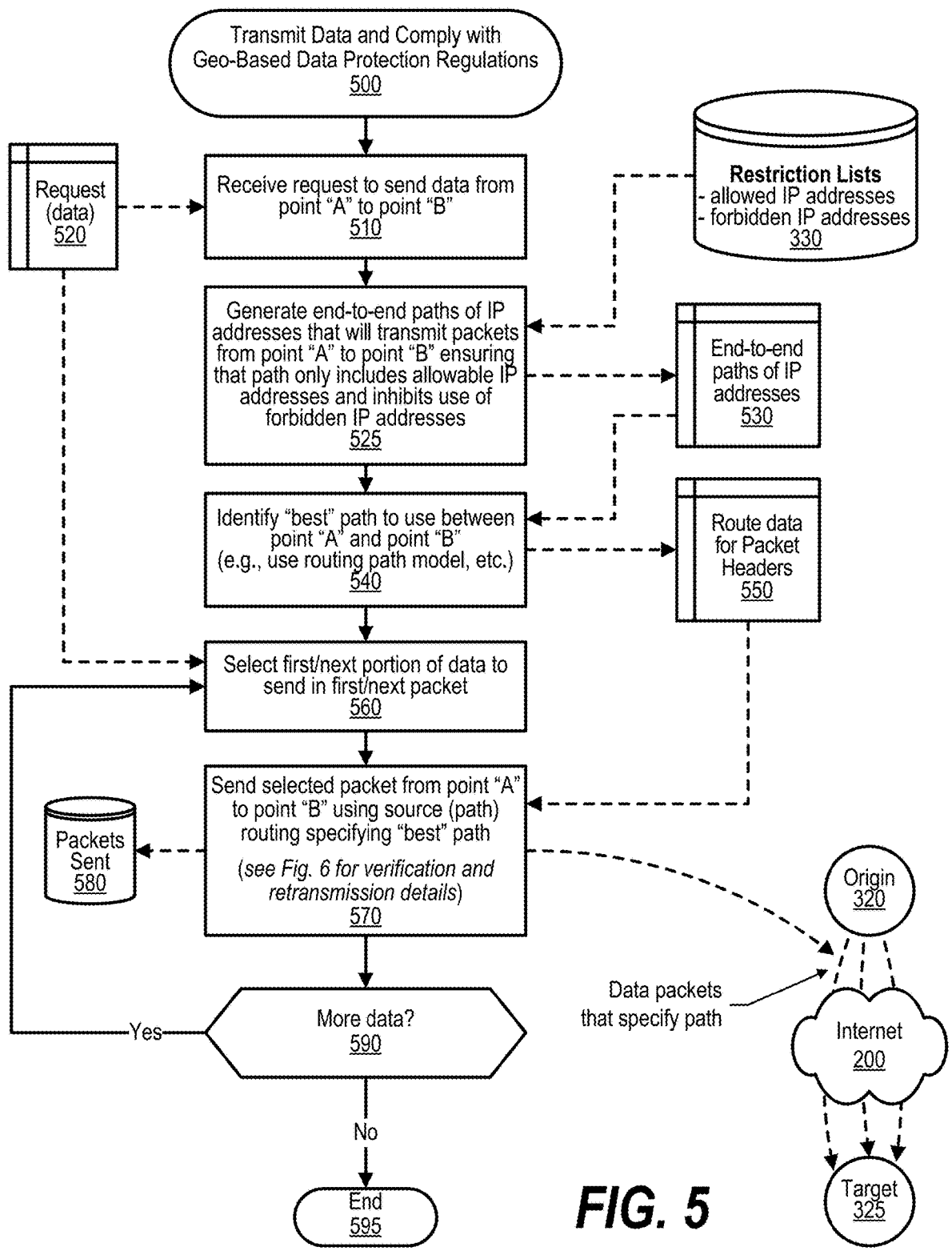
FIG. 5 depicts a flowchart showing details of a process that transmits data through a public network in a fashion that complies with geographic based policies and regulations.

FIG. 5 depicts a flowchart showing details of a process that transmits data through a public network in a fashion that complies with geographic based policies and regulations. FIG. 5 processing commences at 500 and shows the steps taken by a process that transmits data packets through a public computer network in a manner that complies with geographically based data protection regulations. At step 510, the process receives a request to transmit data from point "A" to point "B," represented as origin 320 as the transmitting network device and target 325 as the receiving network device with the public computer network noted as Internet 200. The request along with the data that is being transmitted is stored in memory area 520. At step 525, the process generates one or more end-to-end routing paths of IP addresses that will transmit data packets from point "A" to point "B" and ensure that the routing path only includes allowable IP addresses and inhibits use of disallowed IP addresses. In this manner, the data packets will avoid traveling through any disallowed geographic areas. The allowable end-to-end paths of IP addresses that traverse computer network, such as the Internet, from the transmitting network device to the receiving network device are stored in memory area 530.

At step 540, the process identifies the "best" path to use between point "A" and point "B." The "best" routing path is, in one embodiment, determined using a first routing path model. At step 560, the process selects the first portion of data to send in the first packet with the portion of data being retrieved from memory area 520. At step 570, the process builds and sends the selected packet from point "A" to point "B" using source (path) routing that specifies the identified "best" path between the transmitting network device and the receiving network device. Data regarding the packets that are sent is stored in data store 580. See FIG. 6 for details regarding verification that the packet successfully reached the receiving network device as well as for retransmission details (either in case of router overload or equipment failure, for example).

The process determines as to whether there is more data to be sent to satisfy the transmission request (decision 590). If there is more data to be sent, then decision 590 branches to the 'yes' branch which loops back to step 560 to select and send the next data packet that also uses source path routing that specifies the best identified path between the transmitting network device and the receiving network device that avoids use of any network devices residing in a disallowed geographic location. This looping continues until all of the data has been sent, at which point decision 590 branches to the 'no' branch exiting the loop. FIG. 5 processing thereafter ends at 595.

FIG. 6 depicts a flowchart showing details of processes that handle errors, verification, and possible retransmission of data packets through a public network in a fashion that complies with geographic based policies and regulations. FIG. 6 shows two processes with a first process commencing at 600 that receives acknowledgments and errors pertaining to packets that have been sent (step 610) with this result data being stored in data store 580. As shown, this process continually repeats to collect the data resulting from sent data packets.

A second process commences at 620 that performs verification and retransmission of packets. At step 625, the process selects the first packet sent from data store 580. The process determines whether the selected packet was successfully transmitted (decision 630). If the selected packet was successfully transmitted, then decision 630 branches to the 'yes' branch that bypasses the retransmission steps shown in steps 640 through 680. On the other hand, if the selected packet was not successfully transmitted, then decision 630 branches to the 'no' branch to perform the retransmission steps shown in steps 640 through 680.

At step 640, the process identifies the next "best" path to use between point "A" and point "B" (e.g., use routing path model, etc.). This routing data that is used for the data packet headers is stored in memory area 550. At step 650, the process retransmits the selected packet using the identified next "best" path (e.g., using source path routing that specifies the next best path as the routing path). The process determines whether the retransmission failed (decision 660). If the retransmission failed, then decision 660 branches to the 'yes' branch for further retransmissions. On the other hand, the retransmission was successful, then decision 660 branches to the 'no' branch bypassing steps 670 and 680.

When retransmission fails, the process determines whether there are any more possible paths that can be specified for the data packet (decision 670). If there are more possible paths, then decision 670 branches to the 'yes' branch which loops back to step 640 to identify the next best available path and retransmits the data packet as described above. This looping continues until either the data packet is successfully sent (with decision 660 branches to the 'no' branch) or until there are no more known data paths that only use allowable network devices (at which point decision 670 branches to the 'no' branch exiting the loop and processing ends at 680 with a failure to transmit the data).

The process determines whether there are more packets to process from data store 580 (decision 690). If there are more data packets to process, then decision 690 branches to the 'yes' branch which loops back to step 625 to select and process the next data packet from data store 580 as described above. This looping continues until all of the data packets have been successfully sent from the transmitting network device to the receiving network device, at which point decision 690 branches to the 'no' branch exiting the loop and processing ends at 695.

While particular embodiments have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method implemented by an information handling system that includes a processor and a memory accessible by the processor, the method comprising:

selecting at least one geographic location to which transmission of a data packet is disallowed;

identifying a set of allowed network devices from a plurality of network devices, wherein the identifying comprises:

receiving a plurality of network addresses through which a plurality of test packets traversed during a test transmission;

matching the plurality of network addresses to one or more geographic network device mapping tables, wherein the matching results in a geographic location of each of the plurality of network addresses;

comparing the geographic location corresponding to each of the plurality of network addresses to one or more data protection regulations; and identifying a set of disallowed network addresses that correspond to a set of disallowed network devices based on the comparing, wherein the set of allowed network devices does not include the set of disallowed network devices;

building a routing path through a computer network using the allowed set of network devices; and transmitting the data packet from a transmitting network device to a receiving network device using the routing path.

2. The method of claim 1 wherein at least one of the geographic network device mapping tables is retrieved from an Enhanced Interior Gateway Routing Protocol (EIGRP) database.

3. The method of claim 1 wherein the identification of at least one of the disallowed network devices is based on a legal jurisdiction in which the network device is located.

4. The method of claim 1 further comprising:
determining that the data packet failed to reach the receiving network device;
in response to the determining:
building an alternative routing path through the computer network that also uses the allowed set of network devices; and
retransmitting the data packet from the transmitting network device to the receiving network device using the alternative routing path.

5. The method of claim 1 further comprising:
utilizing source path routing to specify use of the routing path, wherein the routing path is included in a header of the data packet.

6. An information handling system comprising:
one or more processors;
a network adapter that connects the information handling system to a computer network;
a memory coupled to at least one of the processors; and
a set of computer program instructions stored in the memory and executed by at least one of the processors in order to perform actions comprising:
selecting at least one geographic location to which transmission of a data packet is disallowed;
identifying a set of allowed network devices from a plurality of network devices, wherein the identifying comprises:
receiving a plurality of network addresses through which a plurality of test packets traversed during a test transmission;
matching the plurality of network addresses to one or more geographic network device mapping tables, wherein the matching results in a geographic location of each of the plurality of network addresses;
comparing the geographic location corresponding to each of the plurality of network addresses to one or more data protection regulations; and
identifying a set of disallowed network addresses that correspond to a set of disallowed network devices based on the comparing, wherein the set of allowed network devices does not include the set of disallowed network devices;
building a routing path through the computer network using the allowed set of network devices; and
transmitting the data packet from the information handling system to a receiving network device using the routing path.

7. The information handling system of claim 6 wherein at least one of the geographic network device mapping tables is retrieved from an Enhanced Interior Gateway Routing Protocol (EIGRP) database.

8. The information handling system of claim 6 wherein the identification of at least one of the disallowed network devices is based on a legal jurisdiction in which the network device is located.

9. The information handling system of claim 6 wherein the actions further comprise:
determining that the data packet failed to reach the receiving network device;
in response to the determining:
building an alternative routing path through the computer network that also avoid use of the disallowed network devices; and
retransmitting the data packet from the information handling system to the receiving network device using the alternative routing path.

10. The information handling system of claim 6 wherein the actions further comprise:
utilizing source path routing to specify use of the routing path, wherein the routing path is included in a header of the data packet.

11. A computer program product stored in a computer readable storage medium, comprising computer program code that, when executed by an information handling system, performs actions comprising:
selecting at least one geographic location to which transmission of a data packet is disallowed;
identifying a set of allowed network devices from a plurality of network devices, wherein the identifying comprises:
receiving a plurality of network addresses through which a plurality of test packets traversed during a test transmission;
matching the plurality of network addresses to one or more geographic network device mapping tables, wherein the matching results in a geographic location of each of the plurality of network addresses;
comparing the geographic location corresponding to each of the plurality of network addresses to one or more data protection regulations; and
identifying a set of disallowed network addresses that correspond to a set of disallowed network devices based on the comparing, wherein the set of allowed network devices does not include the set of disallowed network devices;
building a routing path through a computer network using the allowed set of network devices; and
transmitting the data packet from a transmitting network device to a receiving network device using the routing path.

12. The computer program product of claim 11 wherein at least one of the geographic network device mapping tables is retrieved from an Enhanced Interior Gateway Routing Protocol (EIGRP) database.

13. The computer program product of claim 11 wherein the identification of at least one of the disallowed network devices is based on a legal jurisdiction in which the network device is located.

14. The computer program product of claim 11 wherein the actions further comprise:
determining that the packet failed to reach the receiving network device;
in response to the determining:
building an alternative routing path through the computer network that also uses the allowed set of network devices; and
retransmitting the data packet from the transmitting network device to the receiving network device using the alternative routing path.

15. The computer program product of claim 11 wherein the actions further comprise:
utilizing source path routing to specify use of the routing path, wherein the routing path is included in a header of the data packet.

* * * * *